(12) United States Patent
Krishnamachari

(10) Patent No.: US 6,546,155 B1
(45) Date of Patent: Apr. 8, 2003

(54) SYSTEM AND METHOD FOR ROTATION INVARIANT REPRESENTATION OF TEXTURE IN IMAGES

(75) Inventor: Santhana Krishnamachari, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,698

(22) Filed: Aug. 4, 1999

(51) Int. Cl.[7] .............................. G06K 9/32; G09G 5/00
(52) U.S. Cl. ....................... 382/296; 382/276; 345/582; 345/649
(58) Field of Search ................... 382/276, 274, 382/296, 307, 190, 100, 254, 297, 295; 704/256; 345/582, 583, 648, 649, 552

(56) References Cited

U.S. PATENT DOCUMENTS

| | | | | |
|---|---|---|---|---|
| 4,267,573 A | * | 5/1981 | Chaikin et al. | 382/296 |
| 4,989,257 A | * | 1/1991 | Horowitz | 382/192 |
| 5,956,427 A | * | 9/1999 | Greenspan et al. | 382/240 |
| 6,002,807 A | * | 12/1999 | Guerci | 382/278 |
| 6,192,150 B1 | * | 2/2001 | Leow et al. | 382/190 |

OTHER PUBLICATIONS

"Circular Neighborhood and 1–D DFT features for texture classification and segmentation", by A. Arof et al., IEEE Proceedings, Vision Image Signal Processing, vol. 145, No. 3, Jun. 1998, pp. 167–172.

1997 IEEE International Conference on Ascoustics, Speech and Signal Processing, vol. 4, pp. 3157–3160.

"Robert Rotation–Invariant Texture Classification: wavelet, Gabor filter and GMRF based Schemes", IEEE Processing Vision Image and Signal Processing, vol. 144, No. 3, pp. 180–188.

"Rotation and Gray–Scale Transform–Invariant Texture Classification Using Spiral Resampling, Subband Decomposition, and Hidden Markow Model", IEEE Transactions on Image Processing, vol. 5, No. 10, Oct. 1996.

* cited by examiner

*Primary Examiner*—Bhavesh M. Mehta
*Assistant Examiner*—Kanji Patel
(74) *Attorney, Agent, or Firm*—Russell Gross

(57) ABSTRACT

There is disclosed an image processing device capable of receiving an image file having a first texture representation in rotation variant format and converting the texture representation to a modified texture representation in a rotation invariant format. The image processing device comprises an image processor for analyzing rotation variant texture parameters in the first texture representation and converting them to 1) rotation invariant texture parameters disposed in circular rings about a selected pixel; or 2)rotation invariant texture parameters disposed along radial lines extending through the selected pixel. In the second embodiment, the image processor can use the angular separation of the radial lines to determine the angular rotation of a rotated version of the image file.

8 Claims, 4 Drawing Sheets

SYSTEM AND METHOD FOR ROTATION INVARIANT REPRESENTATION OF TEXTURE IN IMAGES

TECHNICAL FIELD OF THE INVENTION

The present invention is directed, in general, to image processing systems and, more specifically, to a system for representing textures in images in a rotation invariant Markov random field.

BACKGROUND OF THE INVENTION

The advent of digital television (DTV), the increasing popularity of the Internet, and the introduction of consumer multimedia electronics, such as compact disc (CD) and digital video disc (DVD) players, have made tremendous amounts of multimedia information available to consumers. As video and animated graphics content becomes readily available and products for accessing it reach the consumer market, searching, indexing and identifying large volumes of multimedia data becomes even more challenging and important.

Content-based retrieval systems have been developed that search and retrieve image files, including video images and still images, that contain a certain type of content, usually specified by a user. For example, a user may use a content-based retrieval system to retrieve images files that contain images of circular red objects. Content-based retrieval systems often use texture, along with color and shape, as a criteria for searching in image files.

Texture is one of the important visual features present in images. The ability of a content-based retrieval system to retrieve an image based on texture depends on how texture is represented in an image file. Markov random field (MRF) models are one of the many representations that have been successfully used to represent texture to an image or regions within the image. An MRF model uses a few selected MRF parameters to represent texture characteristics of each region with the image.

For example, Gauss Markov random field (MRF) models represent a selected pixel in an image as a linear combination of a small number of pixels present in a neighborhood around the selected pixel, plus a noise term. However, Gauss MRF parameters are not rotation invariant. That is, if the texture in an image is modeled by MRF parameters and the image is subjected to a rotation (e.g., 90 degrees clockwise) then the MRF texture parameters in the resulting image will be different from the original texture parameters. This is a drawback with respect to applications such as content-based image search and retrieval, which cannot use the texture parameters of a user-selected texture in the original image to search for the same texture in the rotated image. To facilitate content-based image retrieval, it is preferable to have a texture representation that does not vary with image rotation.

There is therefore a need in the art for improved systems and methods for performing content-based image retrieval. In particular, there is a need for systems and methods capable of representing textures in images in a manner that is rotation invariant.

SUMMARY OF THE INVENTION

To address the above-discussed deficiencies of the prior art, it is a primary object of the present invention to provide, for use in an image retrieval system, an image processing device capable of receiving an image comprising a selected pixel having associated therewith a first texture representation specified in a rotation variant format and converting the first texture representation to a second texture representation specified in a rotation invariant format. The image processing device comprises an image processor capable of analyzing rotation variant texture parameters associated with the first texture representation and determining therefrom one of: 1) a first plurality of rotation invariant texture parameters circularly disposed about the selected pixel in at least one ring, wherein the first plurality of rotation invariant texture parameters comprise the second texture representation; and 2) a second plurality of rotation invariant texture parameters disposed along at least one radial line extending through the selected pixel, wherein the second plurality of rotation invariant texture parameters comprise the second texture representation.

According to one embodiment of the present invention, the rotation variant texture parameters are Markov random field parameters.

According to another embodiment of the present invention, a number of the first plurality of rotation invariant texture parameters is equal to a number of the at least one ring.

According to still another embodiment of the present invention, a number of the second plurality of rotation invariant texture parameters is equal to a number of the at least one radial line.

According to a further embodiment of the present invention, the image processor is capable of determining from the second plurality of rotation invariant texture parameters an angular amount of rotation between the image and a rotated version of the image.

According to a still further embodiment of the present invention, the image processor is capable of detecting the angular amount of rotation in increments of 180/K degrees, where K is a number of the at least one radial line.

According to a yet further embodiment of the present invention, the image, processor determines the angular amount of rotation between the image and the rotated version of the image by rotating the second plurality of rotation invariant texture parameters to a plurality of rotation points in increments of 180/K degrees, where K is a number of the at least one radial line, comparing the second plurality of rotation invariant texture parameters with a third plurality of rotation invariant texture parameters associated with the rotated version of the image at each of the plurality of rotation points, and determining a selected one of the plurality of rotation points at which a minimum difference occurs between the second and third plurality of rotation invariant texture parameters.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "processor" or "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged image processing system.

Figure 1:
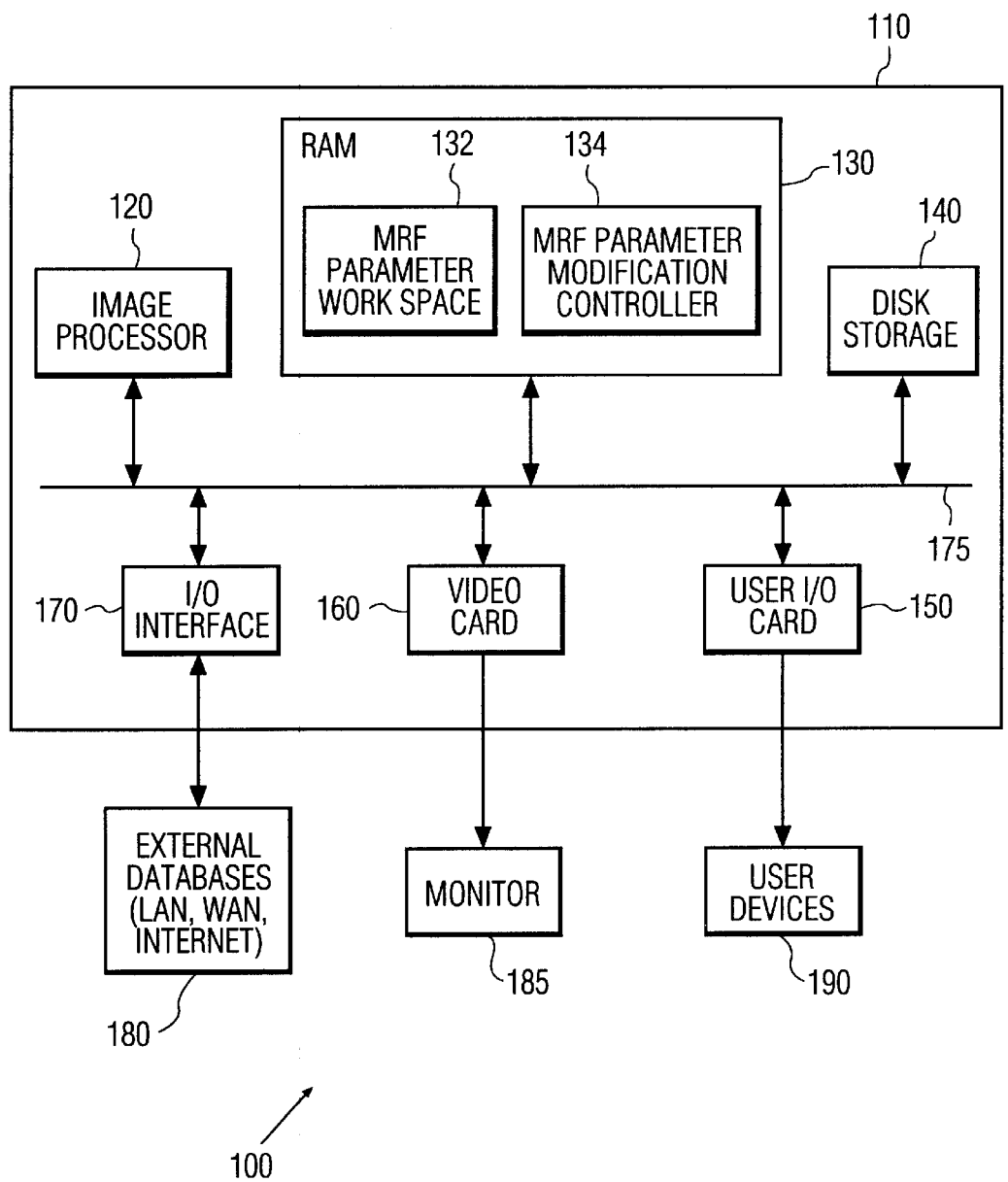
FIG. 1 illustrates an exemplary image retrieval system in accordance with one embodiment of the present invention.

FIG. 1 illustrates exemplary image retrieval system 100 in accordance with one embodiment of the present invention. Image retrieval system 100 comprises image processing system 110, external databases 180, monitor 185, and user devices 190. Image processing system 110 provides means for analyzing image files containing texture parameters that are not in rotation invariant format, such as Gauss Markov random field models, and converting them to texture parameters that are in rotation invariant format.

External databases 180 provides a source for retrieval of a digitized visual image or images, as well as other information for use by the system, as required. These databases may be accessed by means of a local area network (LAN), wide area network (WAN), Internet, and/or other sources, such as direct access to image files stored on external devices such as tape, disk, CD-ROM, DVD disk, and the like. Monitor 185 provides means for visual display of retrieved images.

User device(s) 190 represents one or more peripheral devices that may be manipulated by the user of image retrieval system 100 to provide user inputs for the system. Typical peripheral user input devices include a computer mouse, a keyboard, a lightpen, a joystick, a touch-table and associated. stylus, or any other device that may selectively be used to enter, to select, and to manipulate data, including all or portions of the retrieved image(s) or of the rotation invariant converted images. User device(s) 190 may also include output devices, such as a color printer, which can be utilized to capture a particular retrieved or modified image.

Image processing system 110 comprises image processor 120, random access memory (RAM) 130, disk storage 140, user input/output (I/O) card 150, video card 160, I/O interface 170, and processor bus 175. RAM 130 further comprises MRF parameter work space 132 and MRF parameter modification controller 134. Image processor 120 provides over-all control for image processing system 110 and performs the image processing needed to generate texture parameters that are in rotation invariant format.

This includes analyzing texture images that are not rotation invariant and converting them to rotation invariant format in accordance with the principles of the present invention, processing of digitized video images for transfer to monitor 185 or for storage in disk storage 140, and control of data transfer between the various elements of the image processing system. The requirements and capabilities for image processor 120 are well known in the art and need not be described in greater detail other than as required for the present invention.

RAM 130 provides random access memory for temporary storage of data produced by image processing system 110, which is not otherwise provided by components within the system. RAM 130 includes memory for MRF parameter work space 132, MRF parameter modification controller 134, as well as other memory required by image processor 120 and associated devices. MRF parameter work space 132 represents the portion of RAM 130 in which the initial rotation variant image file and any converted rotation invariant image file are temporarily stored during the conversion process. MRF parameter work space 132 provides means for defining image region(s) and converting texture parameters from an externally or internally supplied image without impacting the original data, so that the original data and image can be recovered, as required.

MRF parameter modification controller 134 represents a portion of RAM 130 that is dedicated to storage of an application program executed by image processor 120 to perform texture parameter conversion in accordance with the principles of the present invention. MRF parameter modification controller 134 may be embodied as a program on a CD-ROM, computer diskette, or other storage media that may be loaded into a removable disk port in disk storage 140 or elsewhere, such as in external databases 180.

Disk storage 140 comprises one or more disk systems, including a removable disk, for permanent storage of programs and other data, including required image data and the program instructions of MRF parameter modification controller 134. Depending upon system requirements, disk storage 140 may be configured to interface with one or more bidirectional buses for the transfer of image data to and from external databases 180, as well as the rest of the system. Depending upon specific applications and the capability of image processor 120, disk storage 140 can be configured to provide capability for storage of a large number of images.

User I/O card 150 provides means for interfacing user device(s) 190 to the rest of image retrieval processing system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides the interface between monitor 185 and the rest of image processing system 110 through data bus 175.

I/O interface 170 provides an interface between external databases 180 and the rest of image retrieval system 100 through bus 175. As previously discussed, external databases 180 has at least one bidirectional bus for interfacing with I/O interface 170. Internal to image processing system 110, I/O interface 170 transfers data received from external databases 180 to disk storage 140 for more permanent storage, to image processor 120, and to RAM 130 to provide temporary storage for texture parameter conversion and monitor display purposes.

Figure 2:
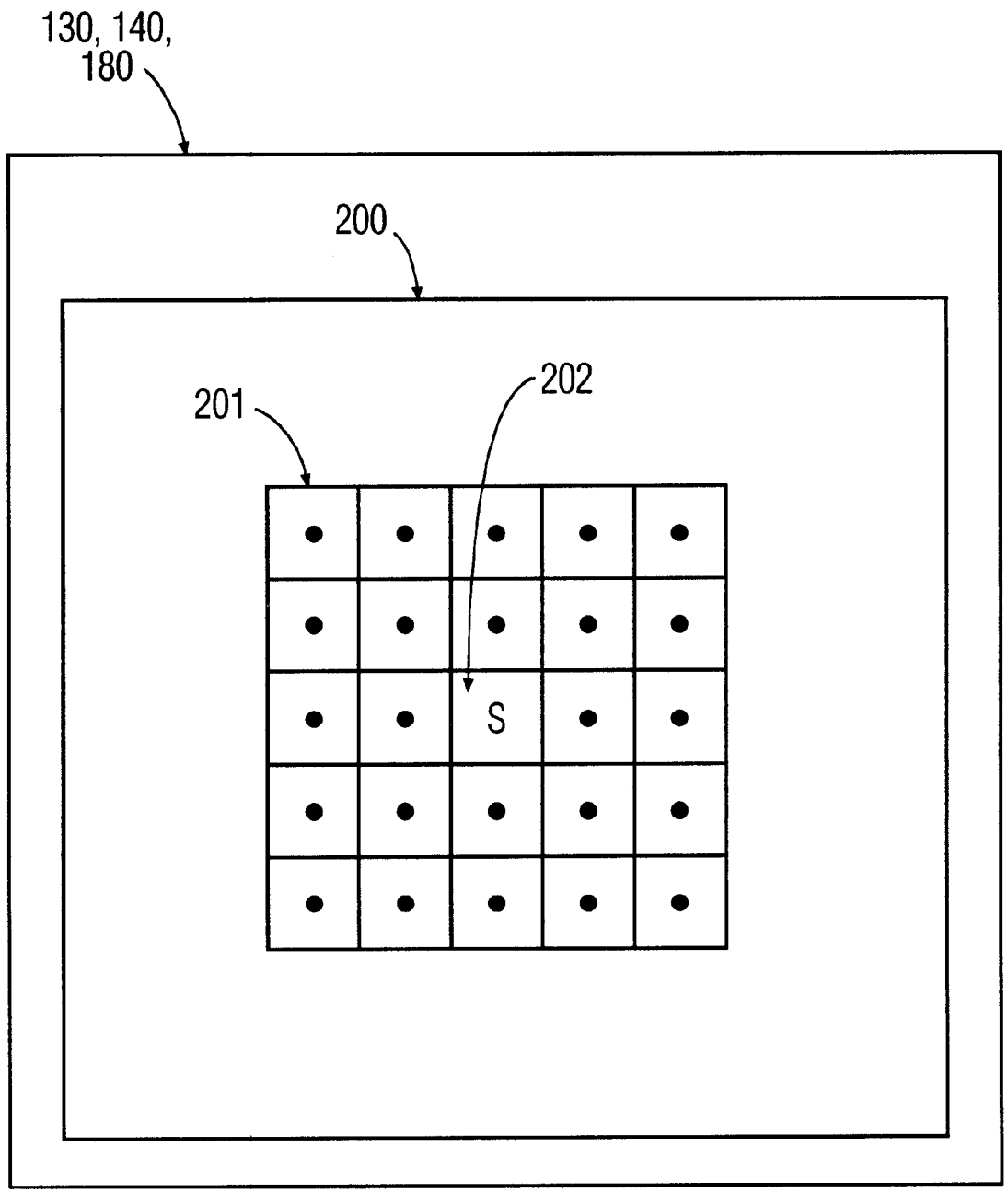
FIG. 2 illustrates an exemplary rotation variant Gauss Markov random field model in accordance with one embodiment of the prior art.

FIG. 2 illustrates a selected pixel in an image in an exemplary Gauss Markov random field model in accordance with one embodiment of the prior art. FIG. 2 depicts pixel block 201, which contains pixel 202 in an image at a site marked 's' in a 5×5 matrix of pixels. According to the Gauss Markov random field model, the selected pixel 202 may be represented as a linear combination of the remaining 24 pixels that are in the shaded region. The dots in the remaining pixels blocks in FIG. 2 represent the pixel locations to which the MRF parameters correspond. The coefficients in the linear combination and the variance of the noise term constitute the parameters associated with the MRF representation. If $X_s$ is the value of pixel 202 at site 's', and R represent the pixels in the shaded neighborhood, then:

$$X_s = \sum_{r \in R} \theta_r X_r + e_s$$

where $e_s$ is a correlated Gaussian noise with variance $\sigma^2$.

The coefficients corresponding to the pixels that are diagonally opposite are constrained to be the same. The coefficients $\theta_r$ and the variance $\sigma^2$ of the noise are the texture parameters associated with the MRF representation. The number of $\theta$ coefficients is equal to half the number of pixels in the shaded neighborhood, since diagonally opposite coefficients are equal. The estimation of the texture parameters for an image or for a given region in an image can be performed by using a simple least-square type estimation. The estimation techniques are already known in the existing literature.

In accordance with the principles of the present invention, image processor 120 receives conventional MRF texture parameters as described above in conjunction with the prior art MRF model, and modifies the texture parameters in such a way that the modified (or converted) parameter representation is rotation invariant. Image processor 120 may perform this conversion in two distinct manners, as illustrated in FIGS. 3A and 3B.

Figure 3A:
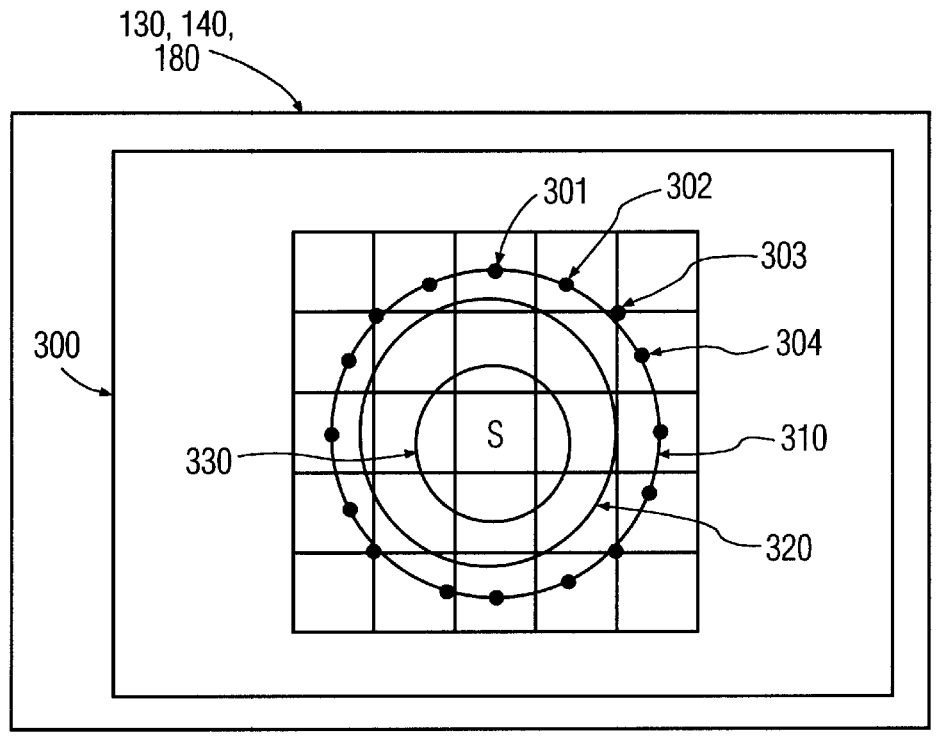
FIG. 3A illustrates an exemplary rotation invariant MRF model in accordance with a first embodiment of the present invention.
Figure 3B:
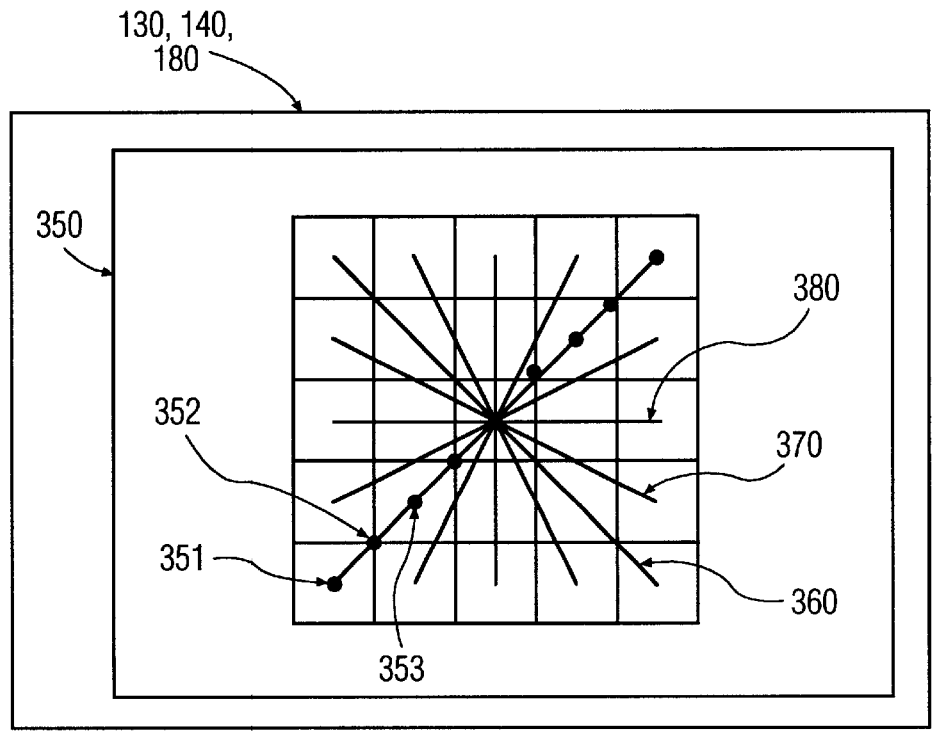
FIG. 3B illustrates an exemplary rotation invariant MRF model according to a second embodiment of the present invention.

FIG. 3A illustrates a selected pixel in an image in an exemplary rotation invariant Markov random field model in accordance with a first embodiment of the present invention. FIG. 3B illustrates a selected pixel in an image in an exemplary rotation invariant Markov random field model in accordance with a second embodiment of the present invention.

In the rotation invariant representation illustrated in FIG. 3A, image processor 120 obtains MRF parameters over circular rings 310, 320, and 330 of different radius as shown in FIG. 3A. Since these parameters are obtained over a circular ring, they do not vary with image rotation. To obtain texture parameters over circular ring 310, image processor 120 obtains values of texture parameters at different angular values and then sums the values.

However, the texture parameters at points 301, 302, 303, 304, etc. on circular ring 310 are unknown. Only the rotation variant parameters at the points shown in FIG. 2 are known. To overcome this, image processor 120 uses a bilinear interpolation technique on the texture parameters associated with the points in FIG. 2 to estimate the texture parameters at the points in FIG. 3A. The number of texture parameters associated with this rotation invariant representation is equal to the number of different radius values used.

Image processor 120 compares different textures using a simple Euclidean distance (or $L_1$ distance) of the corresponding texture parameters. The rotation invariant parameters of the first image are defined as $\phi_{1,i}$ (for i=1,2, ..., n) and the rotation invariant texture parameters on the second image are defined as $\phi_{2,i}$ (for i=1,2, ..., n).

The texture dissimilarity can be computed using the equation:

$$\sum_{i=1}^{n} |\phi_{1,i} - \phi_{2,i}| + |\sigma_1^2 - \sigma_2^2|$$

The texture representation illustrated in FIG. 3A is rotation invariant, but does not indicate the amount of rotation between two textures. In accordance with the principles of an advantageous embodiment of the present invention, image processor 120 may generate a rotation invariant representation of image texture that also indicates the amount of rotation. As illustrated in FIG. 3B, image processor 120 generates rotation invariant MRF texture parameters at selected points 351, 352, 353, etc. over one or more of a plurality of radial lines 360, 370, 380, etc.

To obtain texture parameters over a given radial line, image processor 120 obtains values of parameters at different points along the radial line and sums them. As before, however, the texture parameters at the points on the radial lines are unknown. Only the rotation variant texture parameters at the points marked in FIG. 2 from the original image are known.

As before, image processor 120 uses a bilinear interpolation technique. The number of texture parameters associated with the rotation invariant MRF representation in FIG. 3B is equal to the number of different radial lines used. The more radial lines, the more accurate is the estimation of rotation angle between two textured images. For example, if there are K lines, then rotation in multiples of 180/K degrees can be detected.

As before, image processor 120 compares different textures using a simple Euclidean distance ($L_1$ distance). The computational complexity for a radial line representation, however, is greater than for the texture representation of FIG. 3A. However, the radial line representation gives the amount of rotation between two textured images.

The texture parameters of the first image file may be given as $\beta_{1,i}$ and the texture parameters of the second image file may be given as $\beta_{2,i}$. Image processor 120 may compare $\beta_{1,i}$ and $\beta_{2,i}$ using the $L_1$ distance, thereby determining the dissimilarity between two textured images without any rotation. To measure the dissimilarity between two textured image with a rotation of k*180/K degrees, image processor 120 shifts one of the texture parameter sets by k and then compares the texture parameter set with the other set using $L_1$ distance. Since the amount of rotation is not known in advance, the rotation angle is obtained by comparing the two sets for all possible shifts and the one that results in the minimum value of the distance measure is chosen.

The dissimilarity measurement is given by the equation:

$$\min_{j=0,1,2,\ldots K-1} \sum_{i=0}^{K-1} |\beta_{1,i} - \beta_{2,(i+j)\%K}| + |\sigma_1^2 - \sigma_2^2|$$

where % indicates the mod operation.

Figure 4:
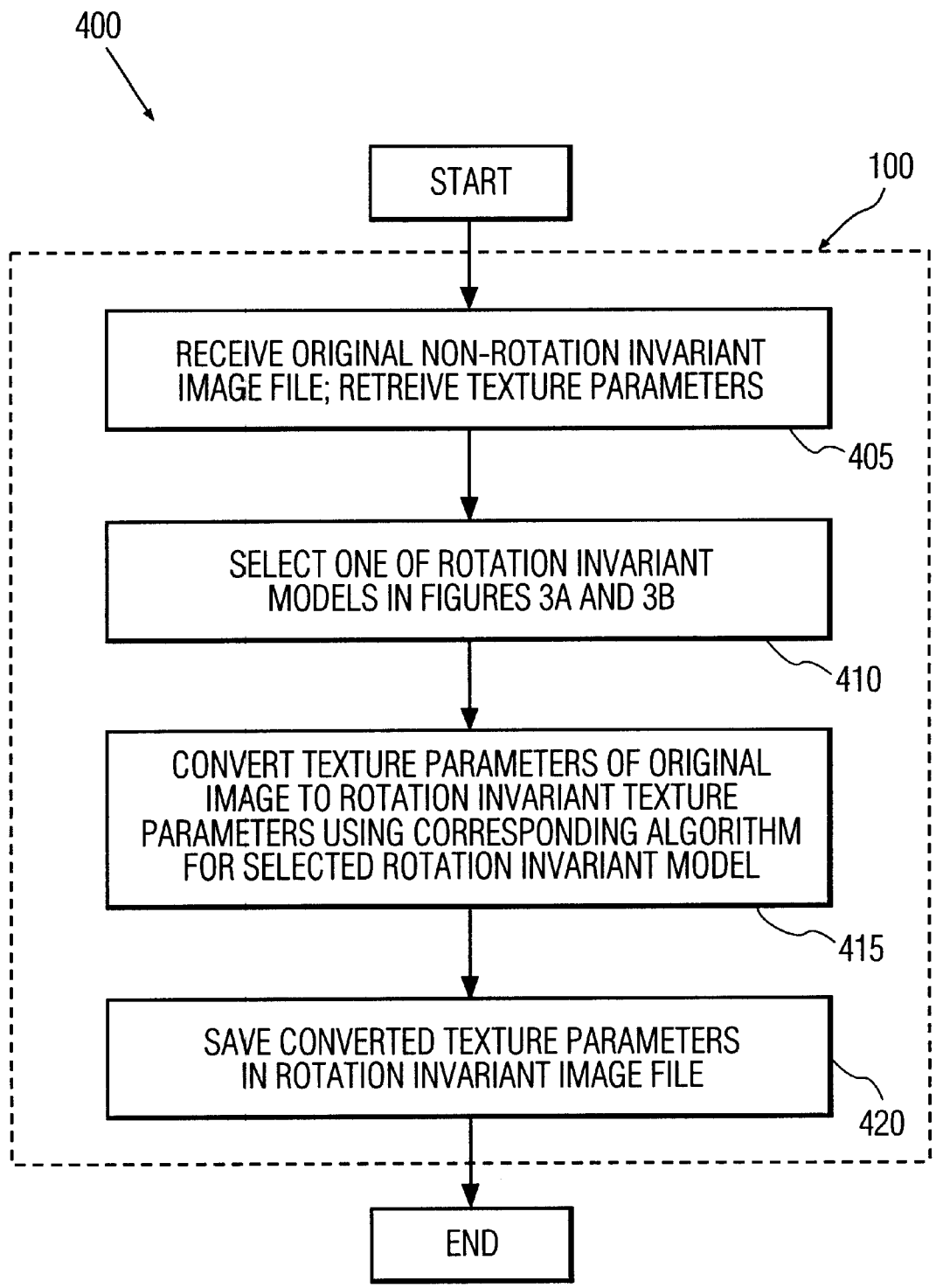
FIG. 4 is a flow diagram illustrating the overall texture parameter conversion operation of an image retrieval system in accordance with the present invention.

FIG. 4 depicts flow diagram 400 which illustrates the overall texture parameter conversion operation of image retrieval system 100 in accordance with one embodiment of the present invention. Image processing system 110 may receive an original image file with conventional (rotation variant) MRF texture parameters or may receive an original image file and then compute the rotation variant MRF parameters, as described for the prior art MRF model. Image processing system 110 transfers this file to disk storage 140 for future retrieval, as subsequently saved in a rotation invariant image file of MRF parameter work space 132 for use in further processing and/or transfer to disk storage 140 and/or external databases 180, as required (process step 420).

Although the present invention has been described in detail, those skilled in the art should understand that they can make various changes, substitutions and alterations herein without departing from the spirit and scope of the invention in its broadest form.

What is claimed is:

1. For use in an image retrieval system, an image processing device capable of receiving an image having associated therewith a first texture representation specified in a rotation variant format associated with a central reference point and converting said first texture representation to a second texture representation specified in a rotation invariant format, said image processing device comprising:

an image processor capable of analyzing rotation variant texture parameters associated with said first texture representation and determining therefrom a plurality of rotation invariant texture parameters disposed along at least one radial line extending through said central reference point, wherein said plurality of rotation invariant texture parameters comprise said second texture representation;

wherein a number of said plurality of rotation invariant texture parameters is equal to a number of said at least one radial line.

2. For use in an image retrieval system, an image processing device capable of receiving an image having associated therewith a first texture representation specified in a rotation variant format associated with a central reference point and converting said first texture representation to a second texture representation specified in a rotation invariant format, said image processing device comprising:

an image processor capable of analyzing rotation variant texture parameters associated with said first texture representation and determining therefrom a plurality of rotation invariant texture parameters disposed along at least one radial line extending through said central reference point, wherein said plurality of rotation invariant texture parameters comprise said second texture representation;

wherein said image processor is capable of determining from said plurality of rotation invariant texture parameters an angular amount of rotation between said image and a rotated version of said image;

wherein said image processor determines said angular amount of rotation between said image and said rotated version of said image by rotating said plurality of rotation invariant texture parameters to a plurality of rotation points in increments of 180/K degrees, where K is a number of said at least one radial line, comparing said plurality of rotation invariant texture parameters with a second plurality of rotation invariant texture parameters associated with said rotated version of said image at each of said plurality of rotation points, and determining a selected one of said plurality of rotation points at which a minimum difference occurs between said plurality and said second plurality of rotation invariant texture parameters.

3. An image retrieval system, comprising:

an image processing device capable of receiving an image having associated therewith a first texture representation specified in a rotation variant format associated with a central reference point and converting said first texture representation to a second texture representation specified in a rotation invariant format, said image processing device comprising:

an image processor capable of analyzing rotation variant texture parameters associated with said first texture representation and determining therefrom a plurality of rotation invariant texture parameters disposed along at least one radial line extending through said central reference point, wherein said plurality of rotation invariant texture parameters comprise said second texture representation;

a display monitor for displaying said image; and a user input device for receiving user commands capable of selecting said image and causing said image processor to determine said one of said first and second pluralities of rotation invariant texture parameters;

wherein a number of said plurality of rotation invariant texture parameters is equal to a number of said at least one radial line.

4. An image retrieval system, comprising:

an image processing device capable of receiving an image having associated therewith a first texture representation specified in a rotation variant format associated with a central reference point and converting said first texture representation to a second texture representation specified in a rotation invariant format, said image processing device comprising:

an image processor capable of analyzing rotation variant texture parameters associated with said first texture representation and determining therefrom a plurality of rotation invariant texture parameters disposed along at least one radial line extending through said central reference point, wherein said plurality of rotation invariant texture parameters comprise said second texture representation;

a display monitor for displaying said image; and a user input device for receiving user commands capable of selecting said image and causing said image processor to determine said one of said first and second pluralities of rotation invariant texture parameters;

wherein said image processor is capable of determining from said plurality of rotation invariant texture parameters an angular amount of rotation between said image and a rotated version of said image;

wherein said image processor determines said angular amount of rotation between said image and said rotated version of said image by rotating said plurality of rotation invariant texture parameters to a plurality of rotation points in increments of 180/K degrees, where K is a number of said at least one radial line, comparing said plurality of rotation invariant texture parameters with a second plurality of rotation invariant texture parameters associated with said rotated version of said image at each of said plurality of rotation points, and determining a selected one of said plurality of rotation points at which a minimum difference occurs between said plurality and said second plurality of rotation invariant texture parameters.

5. For use in an image retrieval system, a method of converting a texture representation of an image from a rotation variant texture representation associated with a central reference point to a rotation invariant texture representation, the method comprising the steps of:

analyzing rotation variant texture parameters associated with the rotation variant texture representation and determining therefrom a plurality of rotation invariant texture parameters disposed along at least one radial line extending through the central reference point, wherein the second plurality of rotation invariant texture parameters comprise the rotation invariant texture representation;

wherein a number of the plurality of rotation invariant texture parameters is equal to a number of the at least one radial line.

6. For use in an image retrieval system, a method of converting a texture representation of an image from a rotation variant texture representation associated with a central reference point to a rotation invariant texture representation, the method comprising the steps of:

analyzing rotation variant texture parameters associated with the rotation variant texture representation and determining therefrom a plurality of rotation invariant texture parameters disposed along at least one radial line extending through the central reference point, wherein the plurality of rotation invariant texture parameters comprise the rotation invariant texture representation;

determining from the plurality of rotation invariant texture parameters an angular amount of rotation between the image and a rotated version of the image;

wherein the step of determining an angular amount of rotation comprises the steps of rotating the plurality of rotation invariant texture parameters to a plurality of rotation points in increments of 180/K degrees, where K is a number of the at least one radial line, comparing the plurality of rotation invariant texture parameters with a second plurality of rotation invariant texture parameters associated with the rotated version of the image at each of the plurality of rotation points, and determining a selected one of the plurality of rotation points at which a minimum difference occurs between the plurality and the second plurality of rotation invariant texture parameter.

7. For use in an image retrieval system, computer executable process steps stored on a computer readable storage medium for converting a texture representation of an image from a rotation variant texture representation associated with a central reference point to a rotation invariant texture representation, the computer executable process steps comprising:

analyzing rotation variant texture parameters associated with the rotation variant texture representation and determining therefrom a plurality of rotation invariant texture parameters disposed along at least one radial line extending through the central reference point, wherein the plurality of rotation invariant texture parameters comprise the rotation invariant texture representation;

wherein a number of the plurality of rotation invariant texture parameters is equal to a number of the at least one radial line.

8. For use in an image retrieval system, computer executable process steps stored on a computer readable storage medium for converting a texture representation of an image from a rotation variant texture representation associated with a central reference point to a rotation invariant texture representation, the computer executable process steps comprising:

analyzing rotation variant texture parameters associated with the rotation variant texture representation and determining therefrom a plurality of rotation invariant texture parameters disposed along at least one radial line extending through the central reference point, wherein the plurality of rotation invariant texture parameters comprise the rotation invariant texture representation;

determining from the plurality of rotation invariant texture parameters an angular amount of rotation between the image and a rotated version of the image;

wherein the step of determining an angular amount of rotation comprises the steps of rotating the plurality of rotation invariant texture parameters to a plurality of rotation points in increments of 180/K degrees, where K is a number of the at least one radial line, comparing the plurality of rotation invariant texture parameters with a second plurality of rotation invariant texture parameters associated with the rotated version of the image at each of the plurality of rotation points, and determining a selected one of the plurality of rotation points at which a minimum difference occurs between the plurality and the second plurality of rotation invariant texture parameters.

* * * * *